(12) United States Patent
Robbins et al.

(10) Patent No.: US 11,233,848 B2
(45) Date of Patent: *Jan. 25, 2022

(54) DEVICE TO DEVICE GROUPING OF PERSONAL COMMUNICATION NODES

(71) Applicant: Orion Labs, San Francisco, CA (US)

(72) Inventors: Jesse Robbins, San Francisco, CA (US); Greg Albrecht, San Francisco, CA (US); Ellen Juhlin, San Francisco, CA (US); Roger Wood, San Francisco, CA (US); Neil Girling, Oakland, CA (US)

(73) Assignee: Orion Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,817

(22) Filed: Jan. 21, 2020

(65) Prior Publication Data
US 2020/0287965 A1 Sep. 10, 2020

Related U.S. Application Data

(63) Continuation of application No. 15/880,281, filed on Jan. 25, 2018, now Pat. No. 10,542,084, which is a
(Continued)

(51) Int. Cl.
*H04W 84/18* (2009.01)
*H04L 29/08* (2006.01)
(Continued)

(52) U.S. Cl.
CPC ........ *H04L 67/1044* (2013.01); *H04B 1/385* (2013.01); *H04L 67/2833* (2013.01);
(Continued)

(58) Field of Classification Search
CPC ............. H04L 29/06027; H04L 12/185; H04L 12/1818; H04W 4/08; H04W 8/186; H04W 36/32; H04M 2203/2044
See application file for complete search history.

(56) References Cited

U.S. PATENT DOCUMENTS 8,782,122 B1 7/2014 Chang
9,507,562 B2 11/2016 Bailey
(Continued)

FOREIGN PATENT DOCUMENTS

GB 1921825 A1 5/2008

*Primary Examiner* — Liton Miah

(57) ABSTRACT

Systems, methods, software and apparatus enable device to device grouping of personal communication nodes include managing a communication node group having communication node members. Attribute information from the communication nodes is provided to a management system that defines communication group membership based on the received attribute information. The management system transmits group membership status notifications to the communication nodes. Membership status controls a node's participation in group communications. Attribute information can include changes (such as dynamic changes) in one or more communication node attributes, such as location, proximity to other communication nodes, speed, etc.

20 Claims, 9 Drawing Sheets

Related U.S. Application Data continuation of application No. 15/157,517, filed on May 18, 2016, now Pat. No. 9,936,010.

(60) Provisional application No. 62/163,703, filed on May 19, 2015.

(51) Int. Cl.
*H04B 1/3827* (2015.01)
*H04N 5/00* (2011.01)
*H04W 4/02* (2018.01)
*H04W 4/08* (2009.01)
*H04W 4/90* (2018.01)
*H04W 4/06* (2009.01)

(52) U.S. Cl.
CPC .............. *H04N 5/00* (2013.01); *H04W 4/023* (2013.01); *H04W 4/08* (2013.01); *H04W 4/06* (2013.01); *H04W 4/90* (2018.02); *H04W 84/18* (2013.01)

(56) References Cited

U.S. PATENT DOCUMENTS

| | | |
|---|---|---|
| 9,807,343 B2 | 10/2017 | Oh et al. |
| 2006/0276213 A1 | 12/2006 | Gottschalk et al. |
| 2008/0263207 A1* | 10/2008 | Popescu .............. H04L 12/1822 709/226 |
| 2012/0151561 A1 | 6/2012 | Kreiner et al. |
| 2012/0224519 A1* | 9/2012 | Kwon ................. H04W 72/005 370/311 |
| 2013/0117372 A1* | 5/2013 | Digate ................... G06Q 10/10 709/204 |
| 2013/0226708 A1 | 8/2013 | Good et al. |
| 2013/0316642 A1 | 11/2013 | Newham |
| 2014/0012587 A1 | 1/2014 | Park |
| 2014/0064492 A1 | 3/2014 | Lakkundi et al. |
| 2014/0189802 A1 | 7/2014 | Montgomery |
| 2014/0229959 A1 | 8/2014 | Beckhardt et al. |
| 2015/0010169 A1 | 1/2015 | Popova |
| 2015/0110313 A1 | 4/2015 | Vedula et al. |
| 2015/0172831 A1 | 6/2015 | Dittberner et al. |
| 2015/0350027 A1 | 12/2015 | Raissinia et al. |
| 2016/0054865 A1* | 2/2016 | Kerr ....................... G06F 16/29 715/739 |
| 2016/0253145 A1 | 9/2016 | Lee et al. |
| 2018/0124527 A1 | 5/2018 | El-Hoiydi et al. |
| 2020/0153892 A1* | 5/2020 | Rodriguez ............ G06F 3/0482 |

* cited by examiner

DEVICE TO DEVICE GROUPING OF PERSONAL COMMUNICATION NODES

RELATED APPLICATIONS

This application is a continuation of U.S. patent application Ser. No. 15/880,281, filed on Jan. 25, 2018, entitled "DEVICE TO DEVICE GROUPING OF PERSONAL COMMUNICATION NODES", which is a continuation of U.S. patent application Ser. No. 15/157,517, filed on May 18, 2016, entitled "DEVICE TO DEVICE GROUPING OF PERSONAL COMMUNICATION NODES," which claims the benefit of and priority to U.S. Provisional Patent Application No. 62/163,703, entitled "DEVICE TO DEVICE GROUPING OF PERSONAL COMMUNICATION NODES", filed May 19, 2015. Each patent application identified above is incorporated herein by reference in its entirety for all purposes.

TECHNICAL FIELD

Aspects of the disclosure are related to communications and, in particular, to establishing and maintaining communication groups based on attributes.

TECHNICAL BACKGROUND

Telephones, computers, and tablets provide an efficient way for users to communicate without being in the same physical location. However, these devices often require the user to provide multiple inputs and preferences for each of the communications before the communications can take place. Such preferences may include the individuals involved in the communication, a contact identifier for the individuals in the communication, amongst a variety of other preferences. Moreover, when busy performing other tasks, it is often obtrusive to hold a telephone, computer, or tablet to make the communication, and takes focus away from the current task. Additionally, changes in the composition of a group engaged in communications can make it difficult and/or impractical for group members to make appropriate changes to their respective communication devices to maintain the correct group members in the communication activity. As a result, it would be advantageous to facilitate establishing and maintaining communication groups in a manner that is dynamic, simple and reliable for users.

OVERVIEW

Implementations of device to device grouping of personal communication nodes include managing a communication node group comprising a plurality of communication nodes. A group management system receives attribute information from the communication nodes and defines communication group membership based on the received attribute information. The management system then transmits group membership status notifications to the various communication nodes. The membership status controls each communication node's participation in group communications. The attribute information can include changes (such as dynamic changes) in one or more communication node attributes, such as location, proximity to other communication nodes, speed, etc.

Implementations can be used to establish, update and terminate communication groups and membership in such groups. Changes can be based on changes in communication nodes' locations and other attributes that are monitored and/or collected by each communication node and supplied to the management system.

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

DETAILED DESCRIPTION

Figure 1:
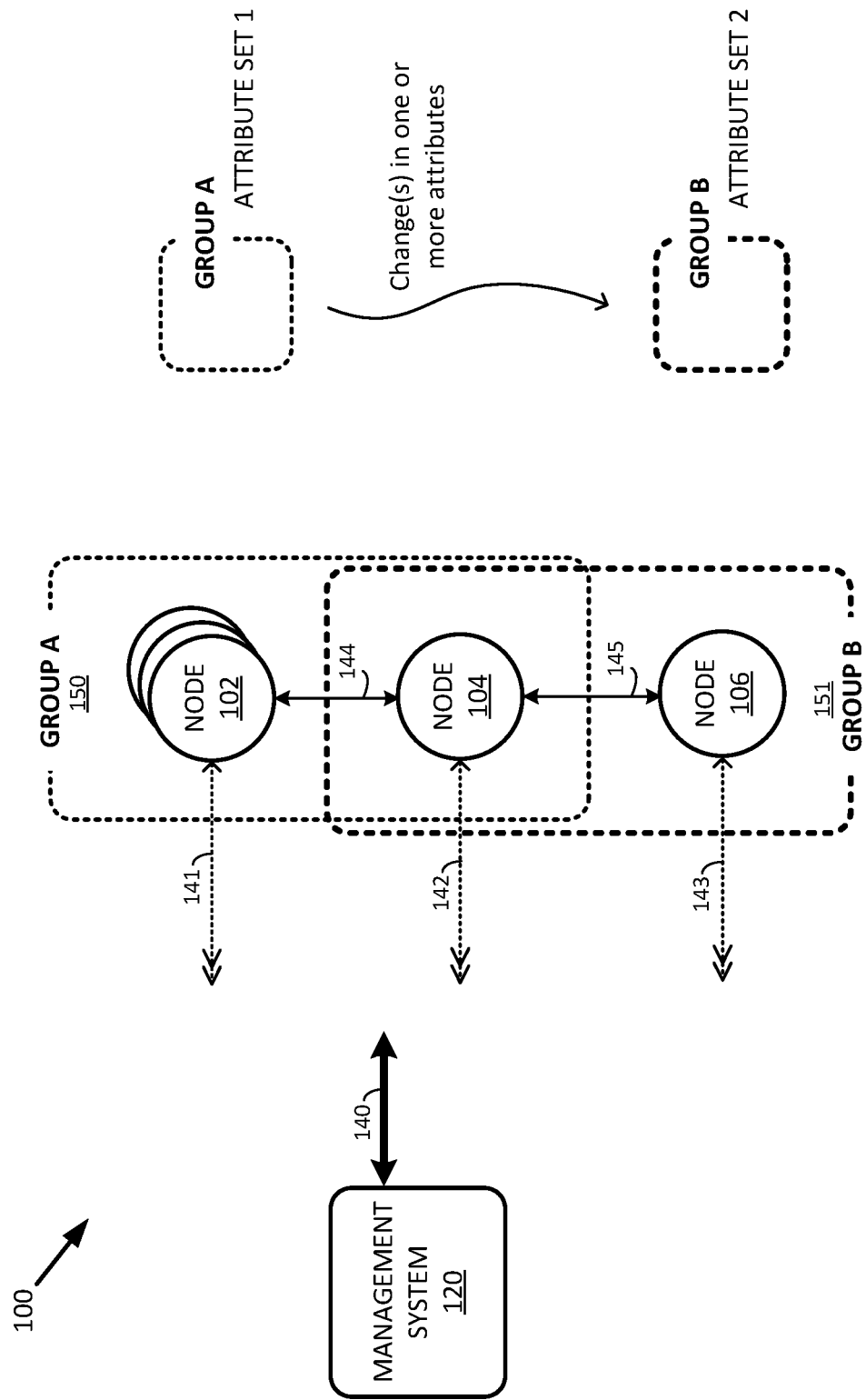
FIG. 1 illustrates a system and operation of personal communication nodes.

FIG. 1 illustrates system 100 and operation of personal communication nodes 102-106. Personal communication nodes 102-106 may each comprise transceivers, speakers, microphones, processing systems, communication interfaces, environmental sensors, accelerometers, gyroscopes, Global Positioning System (GPS) receivers, user interfaces and other components and/or systems to detect various attributes and to send and receive communications to and from management system 120 and other personal communication nodes. Management system 120 may comprise a server system comprising one or more computing devices capable of managing services to and for a plurality of personal communication nodes, such as personal communication nodes 102-106. Management system 120 is capable of operating over one or more computing devices.

Personal communication nodes 102, 104 and 106 communicate with each other and/or with other personal communication nodes over associated links 144, 145. Personal communication nodes 102, 104 and 106 can also communicate with management system 120 over associated ones of links 141-143. Management service system 120 communicates with personal communication nodes via link 140, which can comprise one or more network links in this example.

In FIG. 1, each personal communication node monitors and/or collects one or more attributes from associated microphones, GPS receivers, accelerometers, transceivers, sensors, or other devices capable of monitoring the attributes discussed herein. These attributes comprise any data or information that may be used to define a communication group. For example, time, date, location, communication state, network state, identity, physical proximity, and traveling speed may be attributes of one or more personal communication nodes that may be used to form a group. In addition to attributes that exist naturally (e.g. location, time, date, physical proximity), attributes also may comprise data that is provided by a user (e.g., group selection, duration limits). Communication groups comprise a *nexus* of specified personal communication nodes for interactive communications, information sharing, data exchange, and other mutual exchange.

Personal communication nodes within a group may use secure communication methods. Secure communication methods include means by which users of personal communication nodes 102-106 may securely share information among each other without third-party interception or monitoring of the information or associated communications. Secure communication methods may comprise symmetric key encryption, asymmetric key encryption, public-key encryption, or some other type of encryption, including combinations thereof. The actual communications between personal communication nodes can employ secure communication methods, and the associated links can employ secure communication methods independently.

Personal communication nodes 102-106 periodically transfer messages for delivery to management system 120 indicating changes in one or more node attributes (in some implementations the nodes transfer at least dynamic changes). Personal communication nodes 102-106 may transfer a message to management system 120 whenever an attribute changes or at scheduled and/or periodic intervals. Management system 120 uses received attribute information (e.g., attribute changes, in some instances at least the dynamic changes in one or more attributes) to form, maintain, update and/or terminate one or more groups of personal communication nodes 102-106 and communicates group membership status information to personal communication nodes 102-106 (e.g., current status relative to a specific group and/or past status relative to a specific group, sent to each communication node in a group status notification). Management system features discussed herein may be executed in management system 120 or alternatively can be performed by one or more of personal communication nodes 102-106, including combinations and variations thereof (including one or more nodes operating in concert with management system 120).

In the non-limiting example of FIG. 1, management system 120 forms Group A 150, which includes personal communication nodes 102 and 104 based on Attribute Set 1. Personal communication nodes 102 and 104 receive an affirmative group membership status transferred by management system 120 (e.g., a group membership status notification sent by management system 120) and begin communicating with each other either via links 141 and 142 and/or via link 144. During operation, any of personal communication nodes 102-106 can detect changes in one or more of their attributes and update their attribute profile (e.g., by transferring messages containing attribute information for delivery to management system 120 indicating at least dynamic changes in the one or more attributes). When required or justified by the received attribute information (e.g., attribute change information and/or data), management system 120 can modify the group membership status of one or more of personal communication nodes 102-106 based on and/or using the received attribute information (e.g., attribute change, in some instances at least the dynamic changes in one or more attributes) and subsequently define Group B 151 to include personal communication nodes 104 and 106, but not personal communication node 102, based on Attribute Set 2. One or more of personal communication nodes 102-106 receive a group membership status notification sent or otherwise provided by management system 120 and accordingly change their associated group membership and/or operation based at least on the group membership status. In the non-limiting example of FIG. 1, personal communication node 102 discontinues communication with personal communication node 104 and personal communication nodes 104 and 106 begin communications over links 142 and 143 and/or over link 145 based on group membership status.

Attribute Set 1 and Attribute Set 2 of FIG. 1 may comprise data or other information that can be used to define a group (including creating a new group, terminating an existing group, and/or updating an existing group). For example, time, date, location, communication status, network status, identity, physical proximity, and traveling speed may be attributes of personal communication nodes 102-106 that can be used to define a group. For example, Attribute Set 1 may comprise the following attributes at time $T_1$ (the starting time of the meeting): end user identity; time, date and location of a meeting; and physical proximity of personal communication nodes 102-106. Personal communication nodes 102 and 104 transfer messages containing associated attribute information to management system 120. Management system 120 defines the attributes as Attribute Set 1 and forms Group A 150 at the time of the meeting. Personal communication nodes 102 and 104 receive an affirmative group membership status notification sent (transferred) by management system 120 and begin communicating with each other either via links 141 and 142 and/or via link 144. The end users of personal communication devices 102 and 104 can begin their meeting.

Attributes for personal communication nodes 102-106 pertaining to time, date, and location change after the meeting, and this attribute information is transferred using messages sent to management system 120 indicating changes (e.g., attribute changes such as dynamic changes) to Attribute Set 1. Management system 120 modifies the group membership status of personal communication nodes 102-106 using at least the received attribute changes and defines Group B 151 to include personal communication nodes 104 and 106, but not personal communication node 102, based on Attribute Set 2. Attributes Set 2 may include the following attributes at time $T_2$ (the time the meeting is ended): end user identity; a friend status; and physical proximity of personal communication nodes 104-106. Personal communication nodes 102-106 receive a group membership status notification transferred by management system 120 and change their associated group membership based at least on the group membership status. Personal communication nodes 104 and 106 begin communications over links 142 and 143 and/or over link 145. Now the end user of personal communication node 104 may communicate with her friend, the end user of personal communication node 106, while the end user of personal communication node 104 drives to the house of the end user of personal communication node 106. When the end user of personal communication node 104 arrives at her destination and meets the end user of personal communication node 106, personal communication nodes 104 and 106 provide attribute information indicating that they are within close physical proximity and thus mute the speakers so that the end users may carry on a face-to-face conversation without use of communication nodes 104 and 106.

Communication links 140-143 connect personal communication nodes 102-106 to management service system 120 using appropriate linking (e.g., non-limiting examples of Long Term Evolution (LTE), Global System for Mobile Communication (GSM), Code Division Multiple Access (CDMA), wireless (e.g., IEEE 802.11 WiFi), Bluetooth, Personal Area Networks (PANs), Wide Area Networks, (WANs), Local Area Networks (LANs), Wireless Local Area Networks (WLANs), Internet Protocol (IP), Ethernet, synchronous optical networking (SONET), hybrid fiber-coax (HFC), Time Division Multiplex (TDM), asynchronous transfer mode (ATM), circuit-switched, communication signaling, wireless communications, or some other communication format, including improvements thereof. Communication links 144-145 connect personal communication nodes 102 and 104 and personal communication nodes 104 and 106, respectively (e.g., non-limiting examples including Bluetooth, IEEE 802.11 WiFi, infrared, ultrasonic or any communication format including improvements thereof). Communication links 140-145 each use metal, glass, optical, air, space, or some other material as the transport media. Communication links 140-145 may each be a direct link, or may include intermediate networks, systems, or devices, and may include a logical network link transported over multiple physical links.

Figure 2:
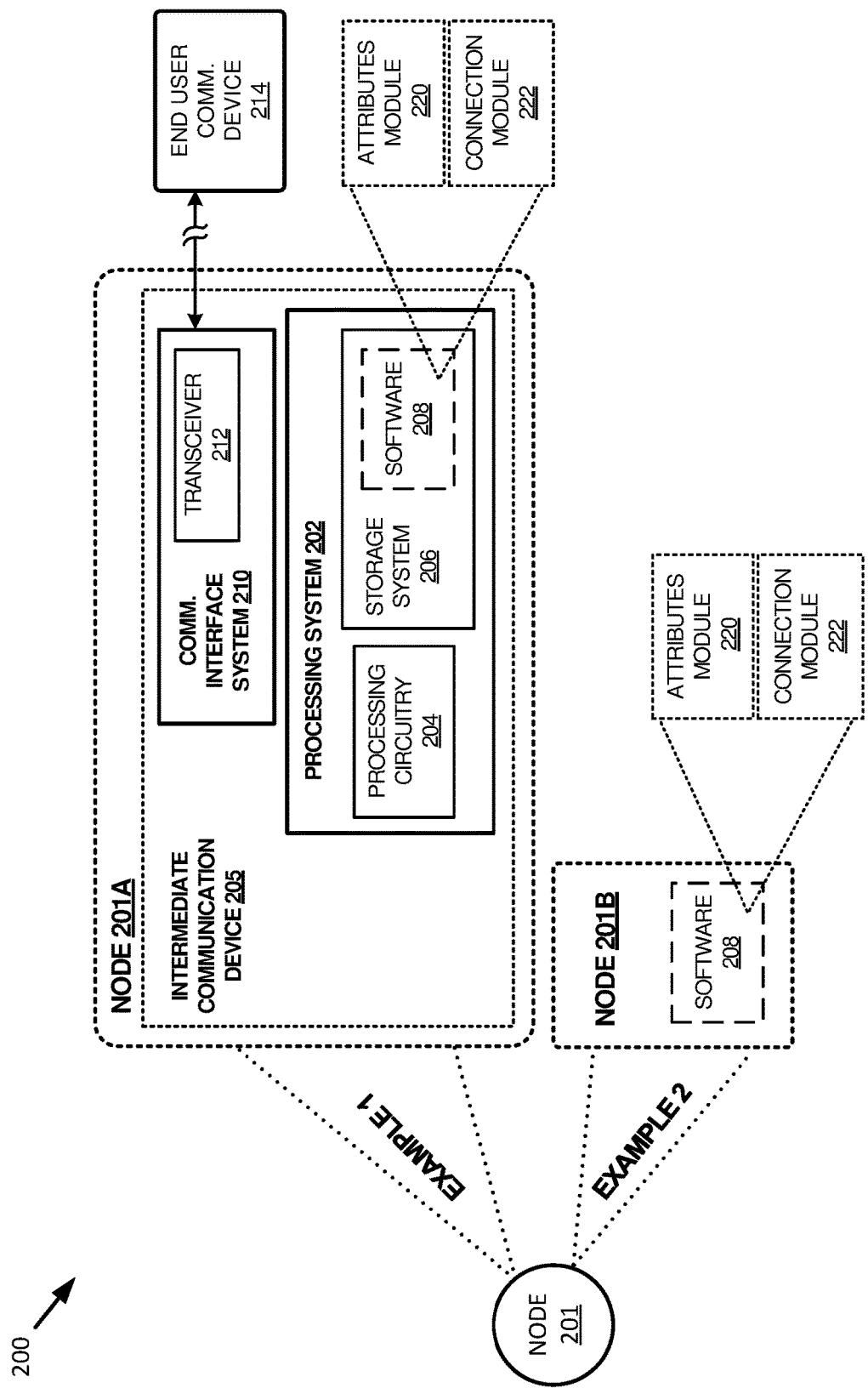
FIG. 2 illustrates exemplary systems for personal communication nodes.

To further illustrate example configurations of the personal communication nodes of FIG. 1, node 201 of FIG. 2 is presented (node 201 may represent one of the communication nodes 102-106 of FIG. 1 or another alternate communication node implementation). A first non-limiting example (Example 1) illustrates a personal communication node 201A comprising a separate end user device that communicates with other group members via an intermediate communication device (e.g., a wireless communication device). In some implementations, the end user device can be a personal (e.g., wearable) electronic device that communicates through an intermediate communication device such as a smartphone, tablet, laptop or other computing system or device.

A second non-limiting example (Example 2) illustrates a personal communication node 201B that does not employ multiple distinct devices, but instead utilizes a single wireless communication device, such as a personal communication node that contains and includes all necessary wireless communication interfaces and processing resources, among other features. Furthermore, software 208 usable in these and other examples can comprise a virtual machine that is executed on a computing device, including virtual devices or software executed by a virtualized processing system or virtualized computing system. It should be understood that features and functions of management system 120 of FIG. 1 can be included in the non-limiting examples of FIG. 2, along with features and functions of the personal communication nodes.

As noted, FIG. 2 illustrates two non-limiting exemplary systems 200 for personal communication nodes, such as personal communication node 201. Personal communication node 201 can be an example of personal communication nodes 102-106; however, personal communication node 201 may have alternative configurations and methods of operation. Example 1 comprises node 201A, which includes intermediate wireless communication device 205 and end user device 214. Intermediate communication device 205 may be a wireless device that comprises a smartphone, tablet device, computer, gaming device, laptop computer, or some other communication device capable of communicating using packet networks or some other communication network. Example 2 illustrates personal communication node software within an operating environment of an electronic device, wherein the electronic device may comprise a smartphone, tablet device, computer, gaming device, laptop computer, or some other communication device capable of communicating using packet networks or some other communication network, running a personal communication node software application that comprises personal communication node 201.

In the illustrated Example 1, node 201A further comprises processing system 202 and communication interface system 210. Processing system 202 further comprises processing circuitry 204 and storage system 206. Processing circuitry 204 comprises microprocessors and other circuitry that retrieves and executes software 208 from storage system 206. Processing circuitry 204 may be embedded in various types of equipment and may comprise a single device or could be distributed across multiple devices—including devices in different geographic areas.

Storage system 206 comprises a non-transitory computer readable storage medium, such as a disk drive, flash drive, data storage circuitry, or some other hardware memory apparatus. Storage system 206 may comprise a single device or could be distributed across multiple devices—including devices in different geographic areas. Storage system 206 may be embedded in various types of equipment. In some examples, a computer apparatus and/or computing system could comprise processing circuitry 204, storage system 206 and software 208. Software 208 comprises attributes module 220 and connection module 222, which may be part of or supplemental to communication software that enables group members' communication with one another. In addition, software 208 may include operating systems, utilities, drivers, network interfaces, applications, or some other type of software.

Attributes module 220 monitors and in some cases may collect and/or store one or more attributes of personal communication node 201A and periodically transfers a message for delivery to a management system, where the message includes attribute information (e.g., regarding changes in the one or more attributes, and/or providing at least dynamic changes). Personal communication node 201A may comprise attribute sensors such as transceivers, speakers, microphones, processing systems, communication interfaces, environmental sensors, accelerometers, gyroscopes, Global Positioning System (GPS) receivers, user interfaces and other systems to monitor various attributes and provide communications to a management system (e.g., management system 120 of FIG. 1). Attributes module 220 may monitor attribute sensors (e.g., periodically or continuously) or attribute sensors may send an interrupt to attributes module 220 when a change is detected. Connection module 222 receives group membership status notification transferred by a management system or the like, and changes the group membership of personal communication node 201A based at least on the group membership status so that personal communication nodes included in the group may communicate with one another.

Communication interface system 210 further comprises transceiver 212 for communicating with device 214. Transceiver 212 comprises communication components, such as ports, signal processing circuitry, memory, software, and the like. Transceiver 212 communicates with device 214 over a link that may comprise a Bluetooth communication link, WiFi link, infrared, ultrasonic or any other communication link between personal communication node 201A and device 214.

In the illustrated Example 2, node 201B may comprise a processing system further comprising processing circuitry and a storage system. Processing circuitry may comprise microprocessors and other circuitry that retrieves and executes software 208. Processing circuitry may comprise a single device or could be distributed across multiple devices—including devices in different geographic areas. Processing circuitry may be embedded in various types of equipment. Node 201B may also comprise a storage system further comprising a non-transitory computer readable storage medium, such as a disk drive, flash drive, data storage circuitry, or some other hardware memory apparatus. The storage system may comprise a single device or be distributed across multiple devices—including devices in different geographic areas. The storage system may be embedded in various types of equipment.

Node 201B further comprises software 208 including attributes module 220 and connection module 222, which may be part of or supplemental to communication software that enables group members' communication with one another. In addition, software 208 may include operating systems, utilities, drivers, network interfaces, applications, or some other type of software. Attributes module 220 monitors one or more attributes of personal communication node 201B and periodically transfers a message for delivery to a management system (e.g., indicating at least dynamic changes in the one or more attributes). Connection module 222 receives group membership status notifications transferred by the management system, and changes the group membership of personal communication node 201B based at least on the group membership status so that personal communication nodes include in the group may communication with one another.

Figure 3:
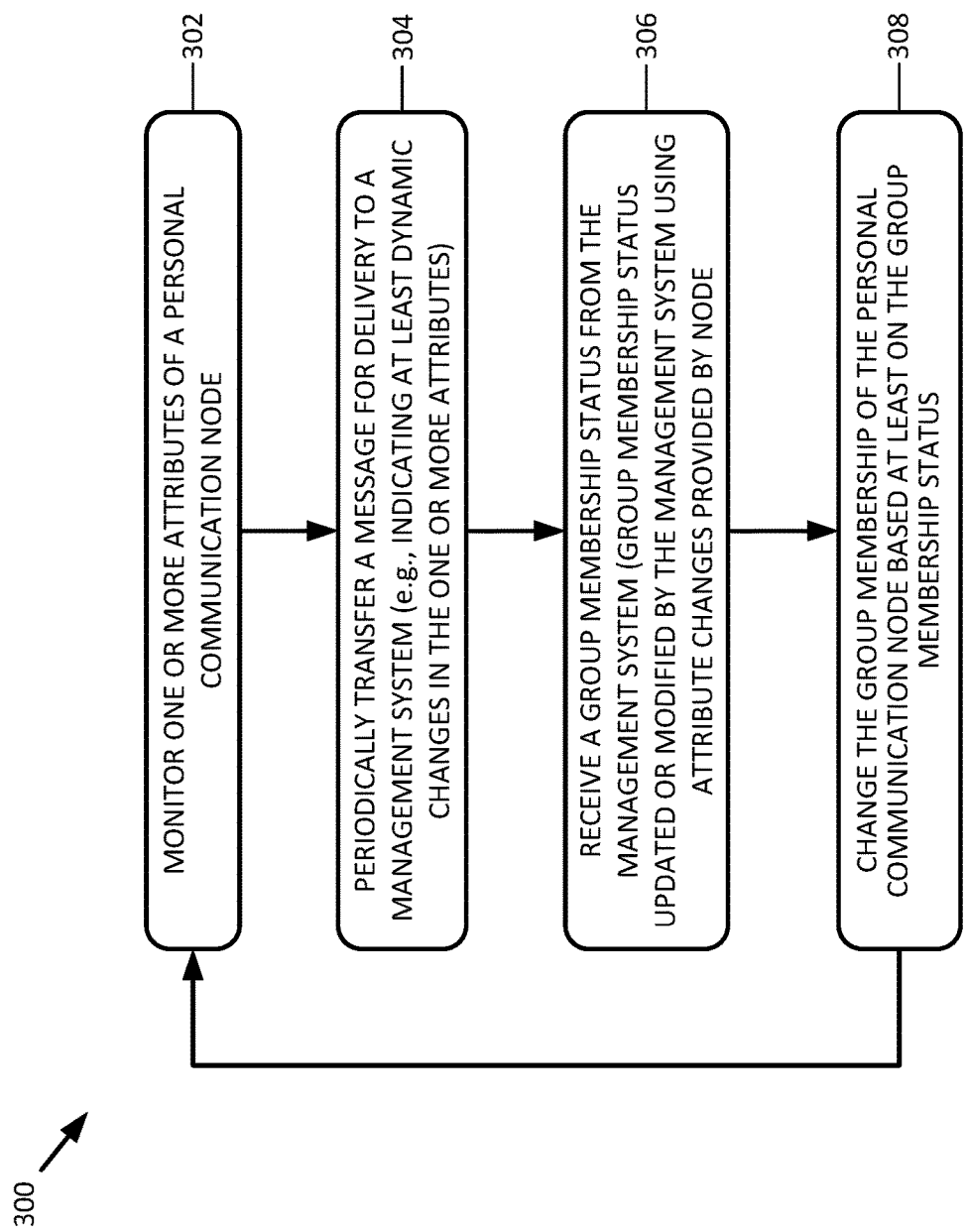
FIG. 3 illustrates the operation of a personal communication node for node to node grouping.

FIG. 3 illustrates one non-limiting exemplary method 300 of the operation of a personal communication node for node to node grouping. Initially, one or more attributes of a personal communication node are monitored (302). A personal communication node implementing process 300 may comprise a speaker, microphone, processing system, communication interface, environmental detectors, accelerometers, gyroscopes, GPS receivers, a user interface and other devices to monitor and/or collect attributes. In addition, a personal communication node may further comprise an attributes module that monitors and/or collects one or more attributes of the personal communication node. Next, the personal communication node transfers (304) a message (e.g., periodically) for delivery to a management system (e.g., indicating at least dynamic changes in the one or more attributes). Such messages can be transferred over an appropriate communication link. A group membership status notification is then transferred (306) by the management system. In some implementations the group membership status is updated or modified by the management system using attribute changes provided by the personal communication node. A personal communication node may comprise a connection module that sends messages to a management system and receives group membership status notifications transferred from the management system. Finally, the group membership of the personal communication node can be changed (308) based at least on the received group membership status. The connection module is configured to change the group membership of the personal communication node.

Figure 4:
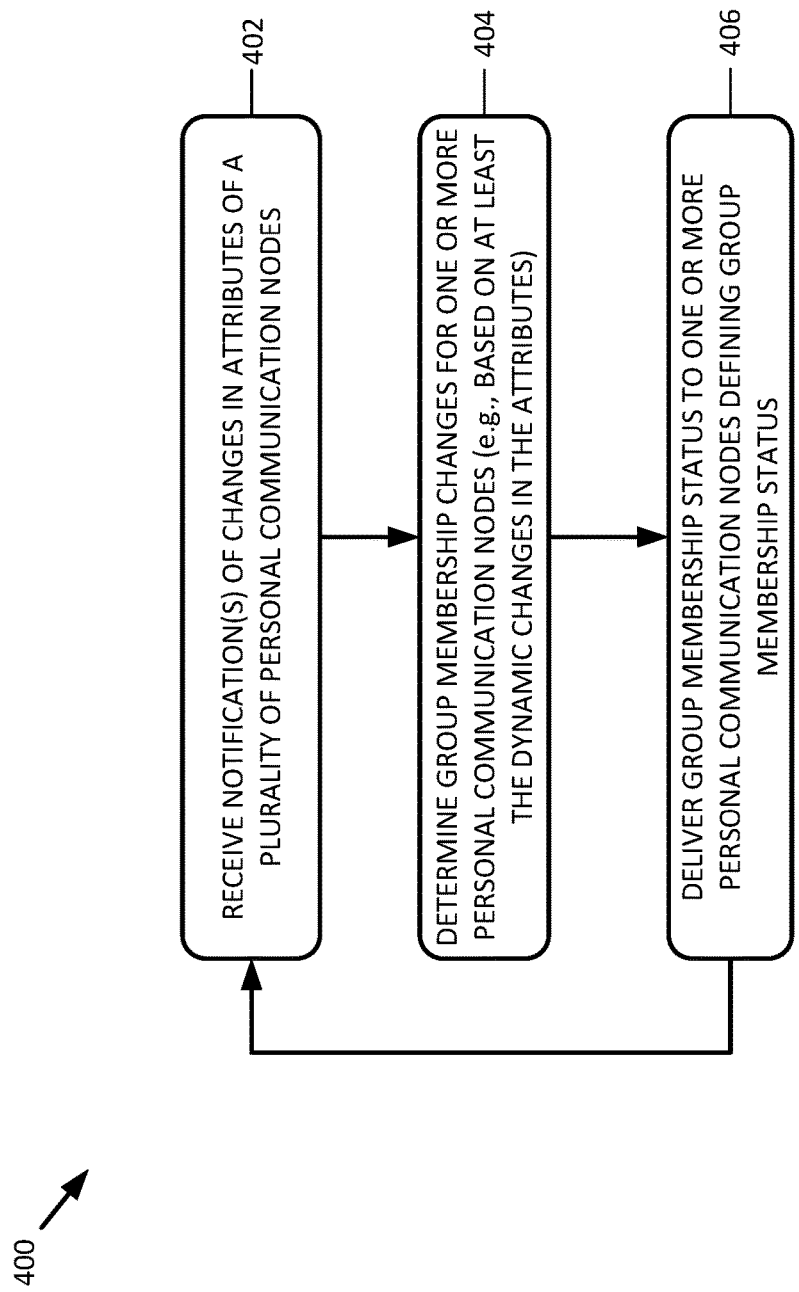
FIG. 4 illustrates the operation of a management system for node to node grouping of personal communication nodes.

FIG. 4 illustrates one non-limiting exemplary method 400 of the operation of a management system for node to node grouping of personal communication nodes. First, the management system receives (402) one or more notifications of changes in the attributes of a plurality of personal communication nodes (e.g., dynamic changes). The management system then determines (404) group membership changes (e.g., based on at least the dynamic changes in the attributes). Finally, the management system transfers (406) group membership status (e.g., in a notification) for delivery to the one or more of the personal communication nodes defining group membership.

Figure 5:
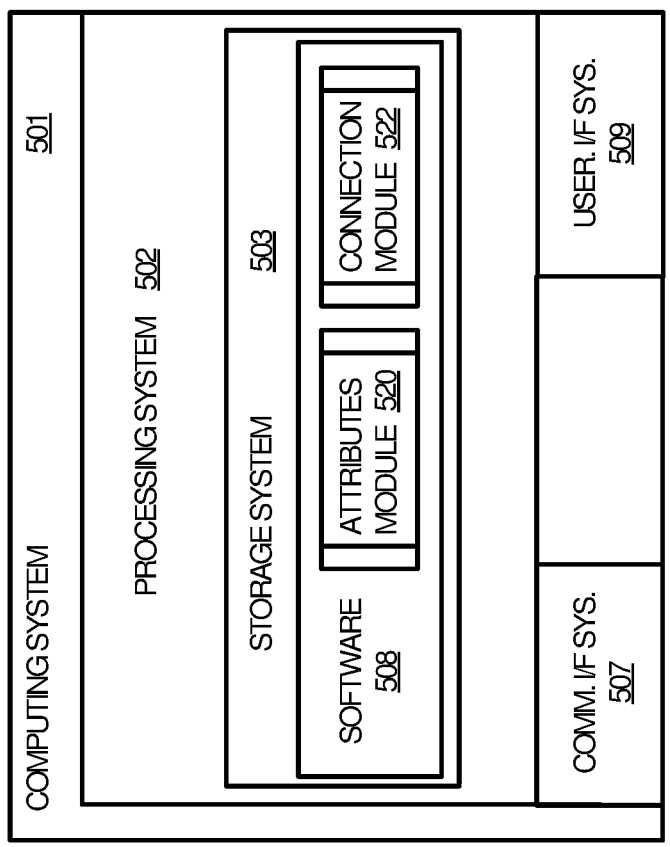
FIG. 5 illustrates a system for node to node grouping of personal communication nodes.

Referring to FIG. 5, computing system 501 is generally intended to represent one or more computing systems on which software 508 may be deployed and executed in order to implement attributes module 520 and connection module 522 to operate as a personal communication node or a management system. In the non-limiting exemplary system 501 of FIG. 5, software 508 and any other software usable to implement dynamic muting as described herein can be stored in storage system 503, which is part of processing system 502, though other configurations can be used. Moreover, computing system 501 may also be suitable as any computing system on which software 508 may be staged and from where one or both may be distributed, transported, downloaded, or otherwise provided to yet another computing system for deployment and execution, or yet additional distribution.

Communication interface system 507 may include communication connections and devices that allow for communication with other computing systems over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces may be input via user interface system 509.

Communication between computing system 501 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, and/or variations thereof and other well known modes. Some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), HTTPS (HTTP secure), SOAP (simply object access protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Figure 6:
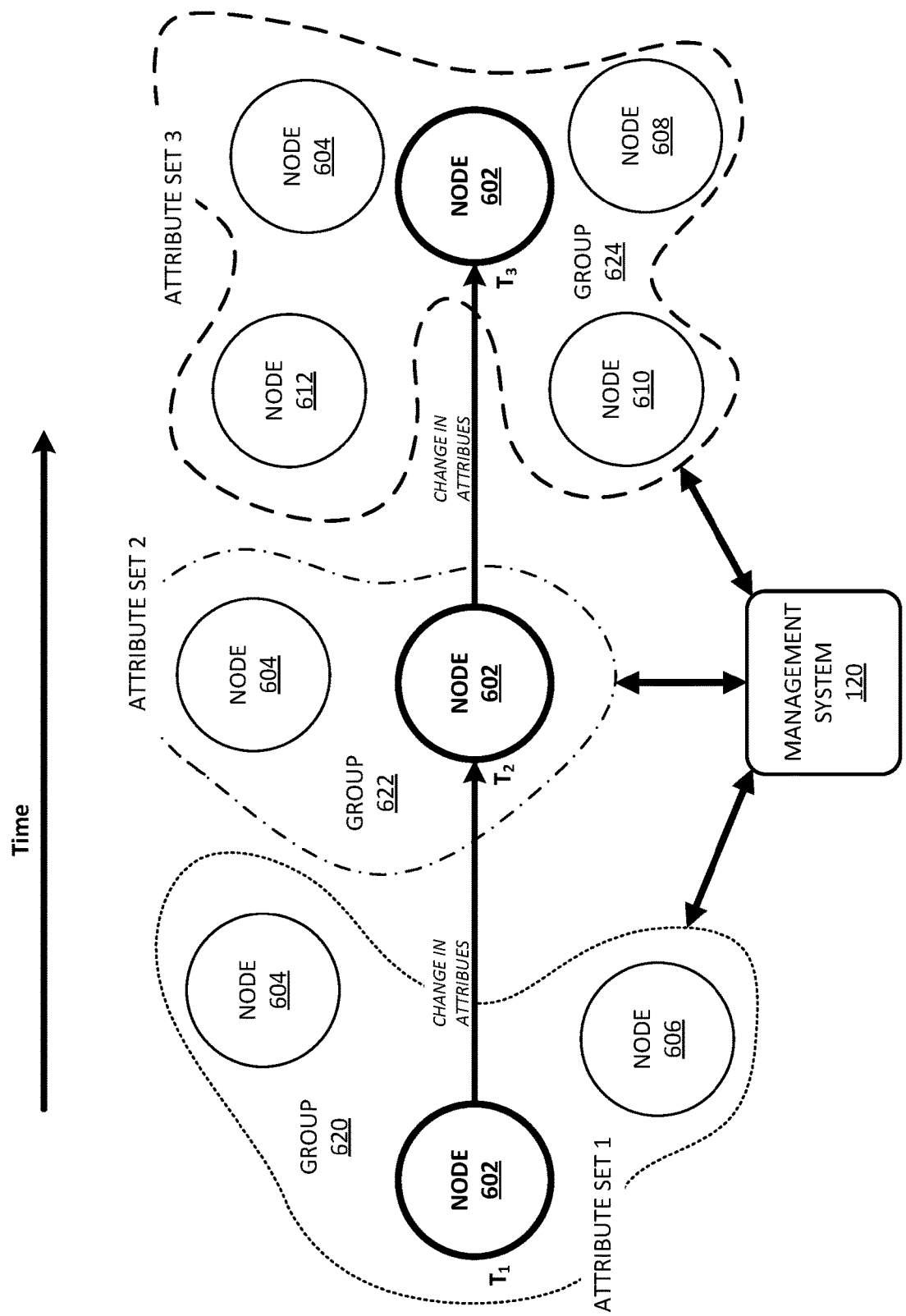
FIG. 6 illustrates dynamic allocation of attributes for node to node grouping of personal communications nodes.

FIG. 6 illustrates dynamic definition of a communication group (e.g., using allocation of attributes) for node to node grouping of personal communications nodes. Personal communication nodes 602-612 are examples of personal communication nodes (e.g., similar to one or more shown as nodes 102-106 in FIG. 1 and node 201 in FIG. 2). However, personal communication nodes 602-612 may have alternative configurations and methods of operation. Groups are created or modified by the management system using attribute changes supplied by one or more communication nodes (e.g., at least the dynamic changes in one or more attributes associated with personal communication nodes 604-612 in FIG. 6). Attributes comprise information or data that may be used by the management system to define groups, thus allowing groups to change dynamically over time without the need for user input. User-created and/or user-defined attributes may also be included and provided to a management system in order to create a group.

As defined at time $T_1$, group 620 comprises personal communication node 602, personal communication node 604 and personal communication node 606. In some implementations personal communication nodes 602-606 share at least one common attribute contained in Attribute Set 1 (attributes that are sent to a management system responsible for defining and modifying groups, for example), and therefore have received an affirmative group membership status notification for group 620 from a management system (e.g., management system 120 of FIG. 6 which in some implementations can operate similarly to management system 120 of FIG. 1). Personal communication nodes that are in the same group are able to communicate with one another (e.g., communicating directly with one another or communicating via management system 120). In some implementations end users of personal communication nodes 604-606 may communicate with each other as long as group 620 exists.

Personal communication nodes 602-612 monitor or collect one or more attributes relating to each node and each node transfers a message to the management system indicating attribute changes (e.g., at least dynamic changes in one or more attributes). The management system modifies the group membership status of personal communication nodes 602-612 using Attribute Set 2 (which has been updated with attribute changes provided by one or more of nodes 602-612 since time $T_1$). Personal communication nodes 602 and 604 receive an affirmative group membership status notification from management system 120 group 622 at time $T_2$. Personal communication nodes 602 and 604 experience uninterrupted group communication during the transition from group 620 to group 622, however personal communication node 606 is no longer a group member and is no longer in communication with personal communication nodes 602 and 604 when group 622 is created (or when group 620 transforms into group 622) by time $T_2$.

Personal communication nodes 602-612 each continue to monitor and/or collect one or more attributes and each node transfers an attribute change message to management system 120 (e.g., indicating at least dynamic changes in one or more attributes). Management system 120 modifies the group membership status of personal communication nodes 602-612 using Attribute Set 3. Personal communication nodes 602, 604, 608, 610 and 612 receive an affirmative group membership status notification from the management system to define group 624 at time $T_3$. Personal communication nodes 602 and 604 experience uninterrupted communication during the transition from group 622 to group 624, however personal communication nodes 608, 610 and 612 are now in communication with personal communication nodes 602 and 604.

Figure 7:
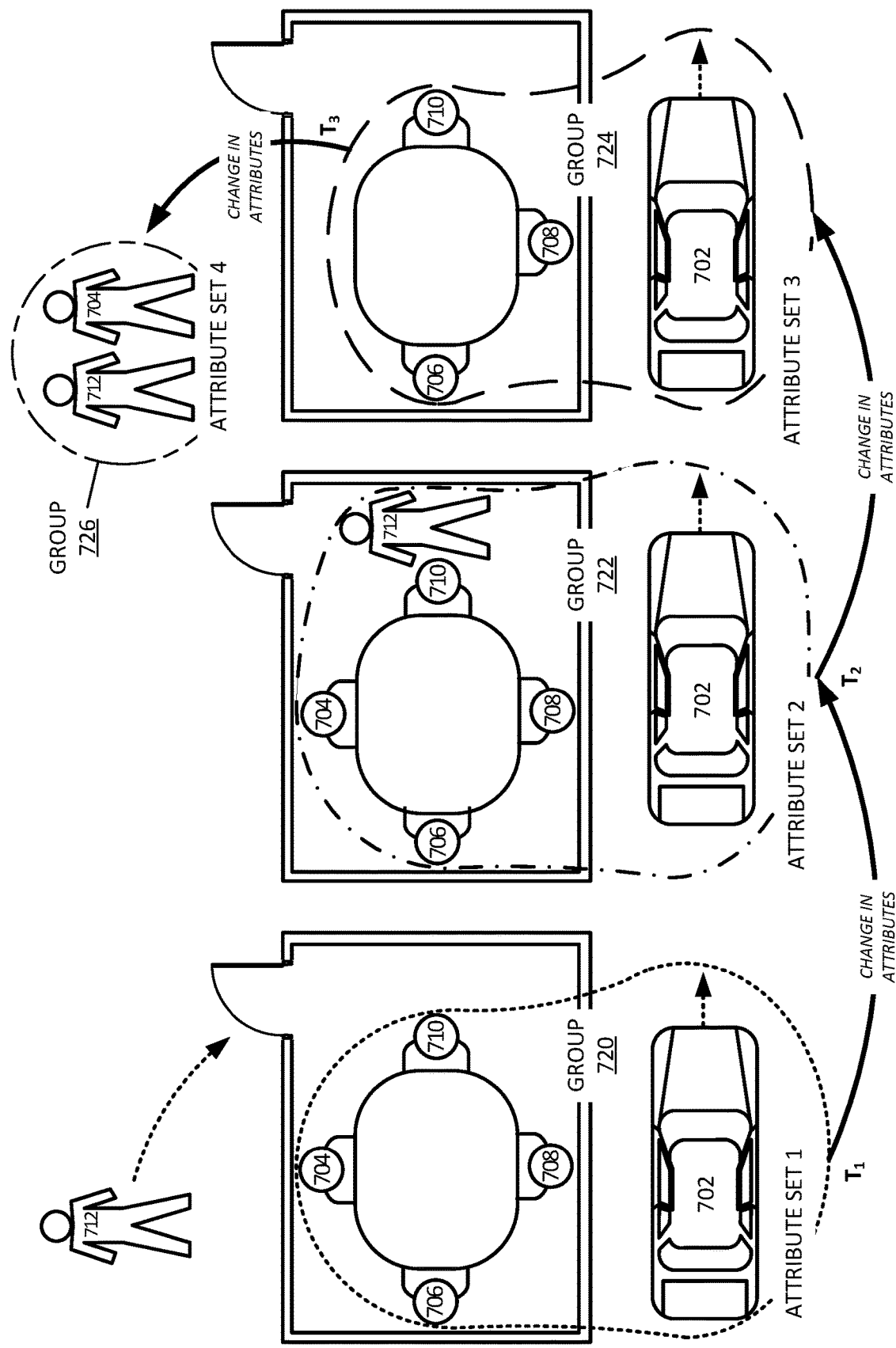
FIG. 7 illustrates an example scenario of node to node grouping of personal communication nodes for a business meeting.

FIG. 7 illustrates an exemplary scenario of node to node grouping of personal communication nodes for a business or other meeting. Personal communication nodes 702-712 are examples of personal communication nodes (e.g., similar to one or more shown as nodes 102-106 in FIG. 1 and node 201 in FIG. 2); however, personal communication nodes 702-712 may have alternative configurations and methods of operation.

A management system (not shown) uses Attribute Set 1 to define group 720 as including personal communication nodes 702-710 at time $T_1$. End user of personal communication node 702 is driving to work at time $T_1$. Personal communication node 702 may communicate with the members of group 720 (e.g., via an onboard wireless communication system in the car, effectively making the car personal communication node 702, or via a wireless communication device in the car that uses a wireless communication system available for mobile devices). End users of personal communication nodes 704-710 are sitting in a meeting room and conversing with the end user of personal communication node 702. Since the end users of personal communication nodes 704-710 are in the same room, audible transmissions from personal communication node 702 are the only communications broadcast (e.g., via one or more of personal communication nodes 704-710) so as not to interfere with the conversation in the room. Personal communication node 702 receives audible communications from personal communication nodes 704-710.

The end user of personal communication node 712 enters the meeting room at time $T_2$. Personal communication nodes 702-712 monitor and/or collect one or more attributes pertaining to each node and each node sends attribute change information to the management system (e.g., dynamic change information indicating at least dynamic changes in one or more attributes). The management system can use a location or related attribute of each of personal communication nodes 702-712 and modify (as necessary, for example) the group membership status of personal communication nodes 702-712 using Attribute Set 2 (which can include recently received attributes and/or attribute changes supplied by the relevant communication nodes). Personal communication nodes 702-712 receive an affirmative group membership status notification from the management system for group 722 at time $T_2$. Personal communication nodes 702-710 experience uninterrupted communication during the transition from group 720 to group 722. However, personal communication nodes 702-710 are now additionally in communication with personal communication node 712.

The end users of personal communication nodes 704 and 712 subsequently leave the meeting room at time $T_3$. Personal communication nodes 702-712 each monitor and/or collect one or more attributes and each node transfers an attribute change message to the management system (e.g., indicating at least dynamic changes in one or more attributes). The management system uses Attribute Set 3 (which can include recently received attributes and/or attribute changes supplied by the relevant communication nodes) to define group 724 and modifies the group membership status of personal communication nodes 702-712. Personal communication nodes 702, 706, 708 and 710 receive an affirmative group membership status notification for group 724 from the management system for group at time $T_3$. Personal communication nodes 702-710 experience uninterrupted communication during the transition from group 722 to group 724. However, personal communication nodes 702 and 712 are no longer in communication with members of the former group 722, which has been transformed into group 724 as a result (at least in part) of attribute change(s). The management system uses Attribute Set 4, which comprises attribute information pertaining to personal communication nodes 704 and 712, to recognize that the end users have left the meeting (former group 722), yet would like to remain in communication. The management system modifies the group membership status of personal communication nodes 702-712 (or at least nodes 704 and 712) using Attribute Set 4. Personal communication nodes 704 and 712 receive an affirmative group membership status notification for group 726 from the management system at time $T_3$. Personal communication nodes 704 and 712 experience uninterrupted communication during the transition from group 724 to group 726. However, personal communication nodes 704 and 712 are no longer in communication with personal communication nodes 702, 706, 708 and 710.

Figure 8:
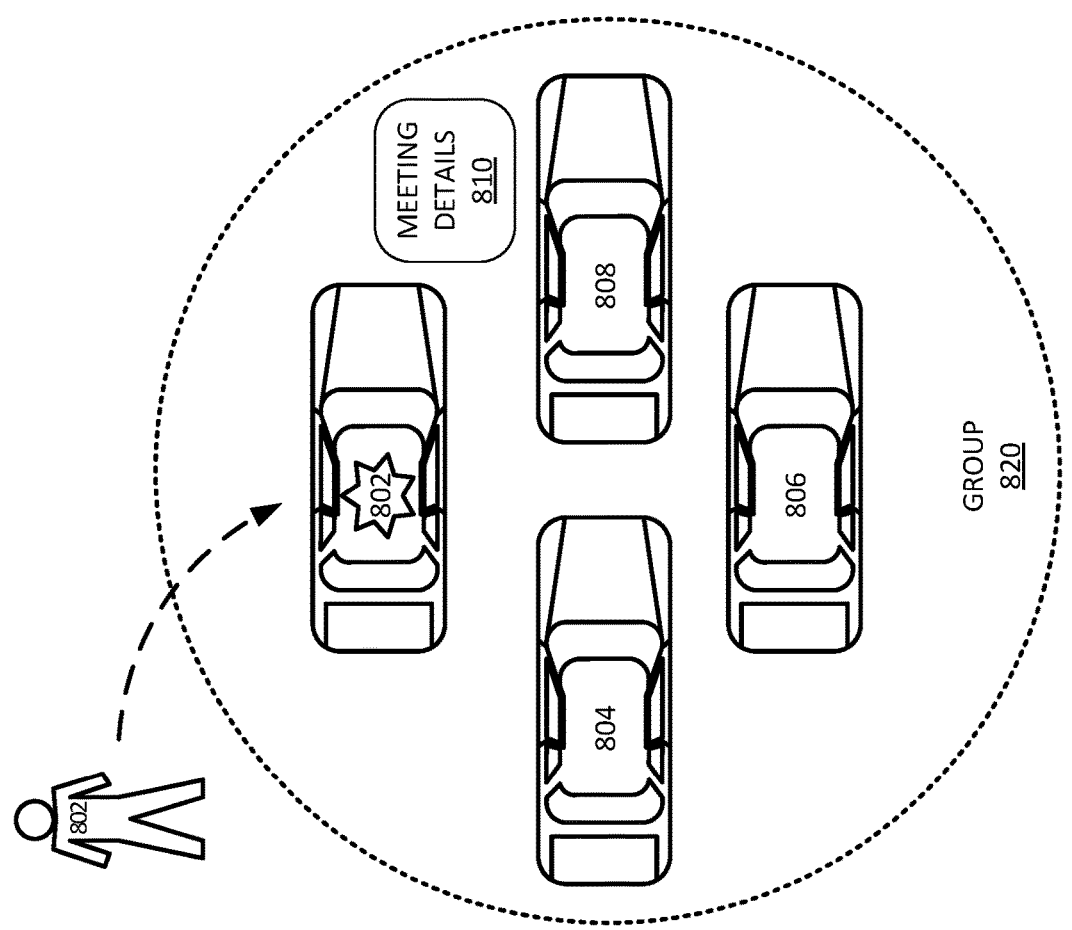
FIG. 8 illustrates an example of node to node grouping of personal communication nodes with in-car computer systems.

FIG. 8 illustrates an example of node to node grouping of personal communication nodes with in-car (and/or otherwise portable or mobile) computer systems. In-car computer systems communicate over a type of network in which vehicles and roadside units are the communicating nodes, providing each other with information, such as safety warnings and traffic information. In-car computer systems also can be capable of wireless communication with the Internet and other wireless global communication networks. Personal communication nodes 802-808 are examples of personal communication nodes (e.g., similar to one or more shown as nodes 102-106 in FIG. 1 and node 201 in FIG. 2); however, personal communication nodes 802-808 may have alternative configurations and methods of operation.

Group 820 initially comprises personal communication nodes 804-808 (e.g., based at least on one or more attributes associated with personal communication nodes 804-808). Personal communication nodes 804-808 are configured to wirelessly exchange data with in-car computer systems. Bluetooth, WiFi, infrared, ultrasonic or any other similar short distance communication link may be used to exchange data between personal communication nodes 804-808 and in-car computer systems. Personal communication nodes 804-808 automatically begin communication with in-car computer systems when the car is within range of the applicable communication link. In some implementations, once each personal communication node 804-808 pairs with its respective in-car computer system, the car becomes the personal communication node.

In the non-limiting example group 820, group membership can be based on at least a vehicle attribute and a business team attribute. End users of nodes 802-808 may verbally communicate with each other as well as exchanging data (e.g., meeting details) for display on their respective in-car computer systems. In FIG. 8 personal communication nodes 804-808 are driving on different roads while personal communication node 802 approaches a parked vehicle. Personal communication node 802 communicates with the in-car computer system when the end user of personal communication node 802 starts the vehicle or otherwise permits pairing with an in-car computing system. The in-car computer system then becomes (or is a part of) a personal communication node 802. Meeting details can be automatically transferred to personal communication node 802 for display.

Figure 9:
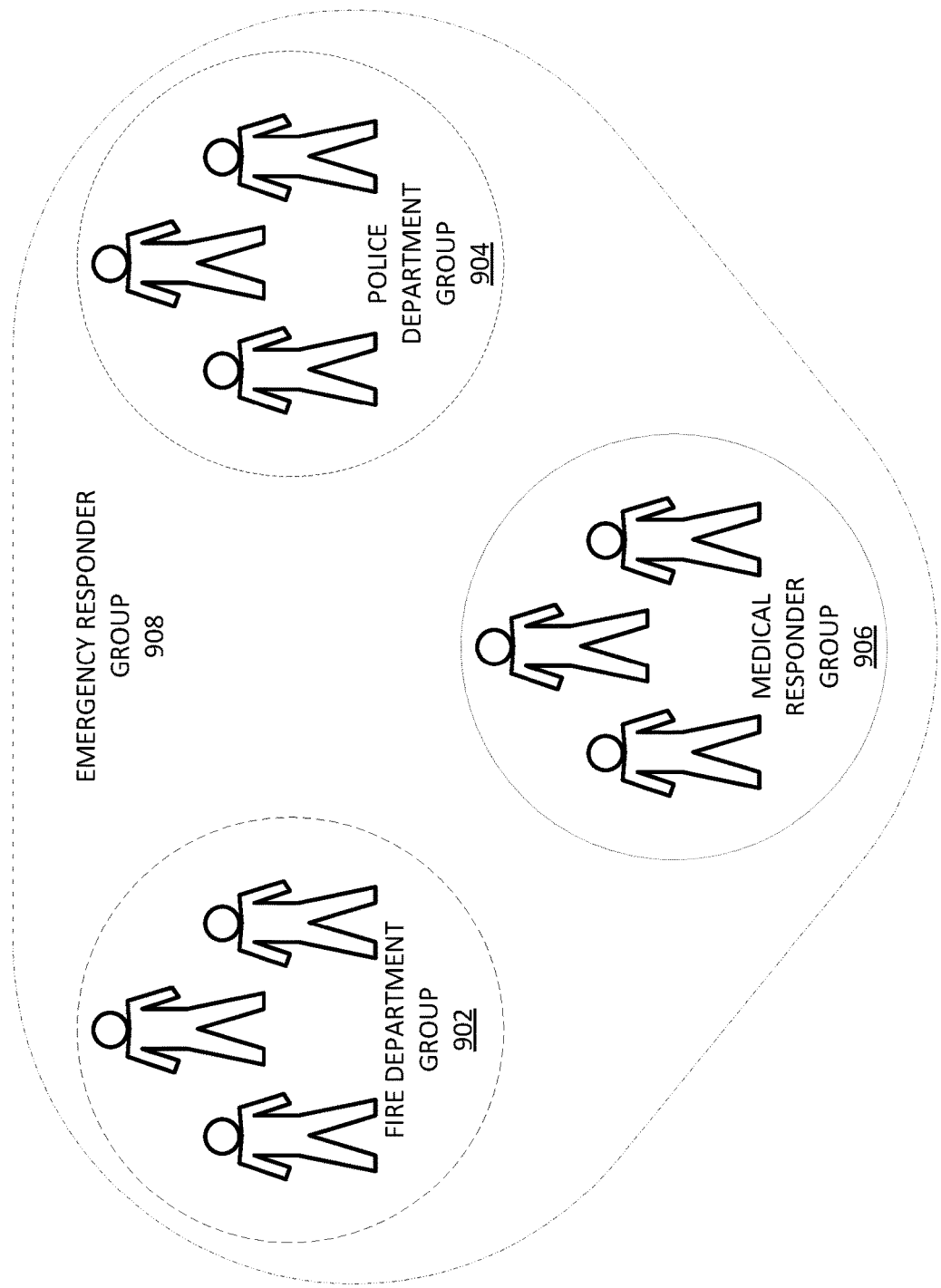
FIG. 9 illustrates an example of node to node grouping of personal communication nodes for emergency response teams.

FIG. 9 illustrates an example of node to node grouping of personal communication nodes for emergency response teams. Personal communication nodes may be members of more than one group simultaneously. Emergency responder group 908 comprises fire department group 902, police department group 904 and medical responder group 906. Fire department group 902, police department group 904 and medical responder group 906 each comprise a plurality of personal communication nodes.

Emergency responder group 908 allows different types of emergency responders to communicate with each other while responding to a particular emergency. Other types of group and sub-group implementations are likewise available using node to node grouping of personal communication nodes. Emergency responder group 908 membership status is based, at a minimum, on attribute information (e.g., a plurality of personal communication nodes' attributes). For example, user identification, job title, rank, emergency responder type, emergency identification and physical location are some attributes that may be used to form emergency responder group 908. Emergency responder group 908 can dynamically change to accommodate the particular emergency at hand because groups can be dynamically created, modified and terminated based on attributes received from the personal communication nodes. In the case of a fire, a management system may form a group comprising firemen who arrive at the fire scene first, then emergency medical responders who arrive subsequently, and then police officers based on their proximity to the emergency. In another example other than a fire (e.g., a crime, shooting, automobile accident), emergency responder group 908 may initially comprise police officers and emergency medical responders. It should be appreciated that, while FIG. 9 illustrates emergency responder group 908 as a singular group, some implementations permit the creation and modification of a plurality of emergency responder groups that could be dynamically created or modified based on the emergency situation at hand and the progress made in addressing the emergency.

FIG. 9 also illustrates emergency responder group 908 further comprising fire department group 902, police department group 904 and medical responder group 906. Emergency responders may choose (e.g., at select times, circumstances and/or locations) to communicate only with emergency responders of the same group in order to limit the total number of communications received (e.g., to prevent excessive communication). For example, a given crime (e.g., a terrorist attack) may result in fires and injuries. Emergency responder group 908 is created comprising fire department group 902, police department group 904 and medical responder group 906. Thus all emergency responder members of group 908 can communicate as they rush to the scene. Once the emergency has been evaluated, fire department group 902, police department group 904 and medical responder group 906 may choose to communicate within their own groups (e.g., to focus fire abatement efforts, to permit triaging of injured individuals). Personal communication nodes are capable of group membership to a plurality of groups and the end user may choose (e.g., via one or more user-selectable attributes) which group to join, communicate with and/or exit at any given time. While FIGS. 1-9 generally depict relatively few personal communication nodes, management systems and attribute modules in exemplary groups, it may be appreciated that the concepts disclosed herein may be scaled to apply to a wide variety of settings, systems and situations. For example, any group disclosed herein could be deployed in support of any number of personal communication nodes.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
   operating a management system to control a plurality of communication node groups, each communication node group comprising a plurality of communication nodes, including:
   collecting attribute information at the management system from the plurality of communication nodes, the attribute information indicating dynamic updates of an environmental status of individual ones of the plurality of communication nodes;
   dynamically adjusting, via the management system, operations of at least some of the plurality of communication nodes based on the attribute information, including:
   modifying the membership of specific communication nodes in selected communication node groups based on dynamic changes to the attribute information of the specific communication nodes; and
   sending group membership status notifications to the specific communication nodes directing the specific communication nodes to dynamically adjust their operation.

2. The method of claim 1 further comprising:
   the specific communication nodes include a first node, a second node, and a third node;
   dynamically adjusting the operations of the at least some of the plurality of communication nodes further includes:
   evaluating attribute information from the specific communication nodes;
   based on the attribute information, creating a first communication group including the first node and the second node, and not including the third node;
   evaluating dynamic changes to the attribute information of the specific communication nodes;
   based on the dynamic changes:
   removing the second communication node from the first communication group; and
   creating a second communication group including the second communication node and the third communication, and not including the first communication node.

3. The method of claim 1 further comprising:
   directing a group membership status notification to an intermediate device of at least one of the specific communication nodes, wherein the at least one of the specific communication nodes includes:
   the intermediate device configured to communicate with the management system and an end user device; and
   the end user device, configured to:
   broadcast audio transmissions received via the intermediate device; and
   receive audio information and transmit it, via the intermediate device, to other communication nodes sharing a group with the at least one of the specific communication nodes.

4. The method of claim 1 further comprising:
   the attribute information includes location information;
   dynamically adjusting the operations of at least some of the plurality of communication nodes includes:
   muting speakers of selected communication nodes based on the location information indicating the selected communication nodes are in close proximity to each other; and
   unmuting speakers of the selected communication nodes based on updated attribute information indicated the selected communication nodes are no longer in close proximity to each other.

5. The method of claim 1 further comprising:
   the management system is executed by a selected one of the plurality of communication nodes; and
   dynamically adjusting the operations of at least some of the plurality of communication nodes includes creating a selected communication group including the management system and a selected subset of the plurality of communication nodes based on the management system and the selected subset sharing a specific attribute set.

6. The method of claim 1 wherein the attribute information comprises information collected by the plurality of communication nodes without user input.

7. The method of claim 1 wherein the attribute information comprises details regarding a scheduled meeting.

8. The method of claim 1 further comprising the attribute information includes dynamic changes to a location of at least one of a first node and a second node in the plurality of communication nodes.

9. An apparatus comprising:
   one or more processors configured to perform a management system to control a plurality of communication node groups, each communication node group comprising a plurality of communication nodes, including the one or more processors configured to:
   collect attribute information from the plurality of communication nodes, the attribute information indicating dynamic updates of an environmental status of individual ones of the plurality of communication nodes;

dynamically adjust operations of at least some of the plurality of communication nodes based on the attribute information, including:

modify the membership of specific communication nodes in selected communication node groups based on dynamic changes to the attribute information of the specific communication nodes; and send group membership status notifications to the specific communication nodes directing the specific communication nodes to dynamically adjust their operation.

10. The apparatus of claim 9 further comprising:

the specific communication nodes include a first node, a second node, and a third node;

dynamically adjust the operations of the at least some of the plurality of communication nodes further includes:

evaluate attribute information from the specific communication nodes;

based on the attribute information, create a first communication group including the first node and the second node, and not including the third node;

evaluate dynamic changes to the attribute information of the specific communication nodes;

based on the dynamic changes:

remove the second communication node from the first communication group; and create a second communication group including the second communication node and the third communication, and not including the first communication node.

11. The apparatus of claim 9 further comprising:

the attribute information includes location information;

dynamically adjust the operations of the at least some of the plurality of communication nodes further includes:

mute speakers of selected communication nodes based on the location information indicating the selected communication nodes are in close proximity to each other; and unmute speakers of the selected communication nodes based on updated attribute information indicated the selected communication nodes are no longer in close proximity to each other.

12. The apparatus of claim 9 further comprising:

the management system is executed by a selected one of the plurality of communication nodes;

dynamically adjust the operations of at least some of the plurality of communication nodes includes:

create a selected communication group including the management system and a selected subset of the plurality of communication nodes based on the management system and the selected subset sharing a specific attribute set.

13. The apparatus of claim 9 further comprising the attribute information comprises details regarding a scheduled meeting.

14. The apparatus of claim 9 further comprising the attribute information includes dynamic changes to a location of at least one of a first node and a second node in the plurality of communication nodes.

15. A memory device storing instructions that, when executed, cause one or more processors to perform a method comprising:

operating a management system to control a plurality of communication node groups, each communication node group comprising a plurality of communication nodes, including:

collecting attribute information at the management system from the plurality of communication nodes, the attribute information indicating dynamic updates of an environmental status of individual ones of the plurality of communication nodes;

dynamically adjusting, via the management system, operations of at least some of the plurality of communication nodes based on the attribute information, including:

modifying the membership of specific communication nodes in selected communication node groups based on dynamic changes to the attribute information of the specific communication nodes; and sending group membership status notifications to the specific communication nodes directing the specific communication nodes to dynamically adjust their operation.

16. The memory device of claim 15 storing instructions that, when executed, cause the one or more processors to perform the method further comprising:

the specific communication nodes include a first node, a second node, and a third node;

dynamically adjusting the operations of the at least some of the plurality of communication nodes further includes:

evaluating attribute information from the specific communication nodes;

based on the attribute information, creating a first communication group including the first node and the second node, and not including the third node;

evaluating dynamic changes to the attribute information of the specific communication nodes;

based on the dynamic changes:

removing the second communication node from the first communication group; and creating a second communication group including the second communication node and the third communication, and not including the first communication node.

17. The memory device of claim 16 storing instructions that, when executed, cause the one or more processors to perform the method further comprising:

the attribute information includes location information;

dynamically adjusting the operations of at least some of the plurality of communication nodes includes:

muting speakers of selected communication nodes based on the location information indicating the selected communication nodes are in close proximity to each other; and unmuting speakers of the selected communication nodes based on updated attribute information indicated the selected communication nodes are no longer in close proximity to each other.

18. The memory device of claim 17 storing instructions that, when executed, cause the one or more processors to perform the method further comprising the attribute information comprises details regarding a scheduled meeting.

19. The memory device of claim 18 storing instructions that, when executed, cause the one or more processors to perform the method further comprising:

the management system is executed by a selected one of the plurality of communication nodes; and dynamically adjusting the operations of at least some of the plurality of communication nodes includes creating a selected communication group including the management system and a selected subset of the plurality of communication nodes based on the management system and the selected subset sharing a specific attribute set.

20. The memory device of claim 15 further comprising the attribute information includes dynamic changes to a location of at least one of a first node and a second node in the plurality of communication nodes.

* * * * *